3,409,505
METHOD FOR THE PRODUCTION OF 5'-INOSINIC ACID

Akira Imada, Nishinomiya, Seizi Igarasi, Ashiya, Ikuo Nogami, Kyoto, and Yoshio Nakao, Ibaraki, Japan, assignors to Takeda Chemical Industries, Ltd., Osaka, Japan
No Drawing. Filed Nov. 4, 1965, Ser. No. 506,390
Claims priority, application Japan, Nov. 4, 1964, 39/62,637
5 Claims. (Cl. 195—28)

This invention relates to a method for the production of 5'-inosinic acid (hereinafter referred to as 5'-IMP). More particularly, this invention relates to a method for the production of 5'-IMP which comprises inoculating an adenine and amino acid double-requiring mutant of a *Bacillus megaterium* de Bary microorganism capable of accumulating 5'-nucleotides other than 5'-IMP, into a culture medium containing both adenine source and amino acid source, incubating said culture medium until 5'-IMP is accumulated in the culture medium, and recovering the 5'-IMP so accumulated from the culture medium.

It is known that 5'-IMP plays an important role as a precursor in the biosynthesis of purine nucleotides and also as a flavor enhancing agent.

The present inventors found that incubation of certain mutants induced from *Bacillus megaterium* de Bary microorganisms capable of accumulating 5'-nucleotides (e.g. 5'-adenylic acid, 5'-guanylic acid, 5'-uridylic acid, 5'-cytidylic acid) other than 5'-IMP in a culture medium, brings about accumulation of exclusively 5'-IMP in a remarkably large amount in the culture medium, and that thus-accumulated 5'-IMP is easily recoverable from the culture medium. Further study has led the present inventors to the fact that the mutants are those requiring for the growth especially both adenine source and amino acid source. These mutants are here designated "adenine and amino acid double-requiring" mutants.

The object of this invention is to provide a method for preparing 5'-IMP, which can be efficiently put into practice on an industrial scale with good yield. The object is realized by inoculating an adenine and amino acid double-requiring mutant of a *Bacillus megaterium* de Bary microorganism which has an ability for accumulating 5'-nucleotides, into a culture medium containing adenine source and amino acid source, incubating said culture medium, and recovering so-accumulated 5'-IMP from the culture medium. (Hereinafter the mutants mentioned above are individually referred to as "adenine and amino acid double-requiring mutant of this invention.")

Adenine and amino acid double-requiring mutant of this invention is induced by applying a per se conventional method for mutation of microorganisms. More concretely, wild type microorganisms belonging to the *Bacillus megaterium* de Bary microorganisms and capable of accumulating 5'-nucleotides other than 5'-IMP are treated with e.g. ultraviolet ray, X-ray, nitrogen mustard, nitrous acid, etc. Employment of spontaneously induced adenine and amino acid double-requiring mutant of a *Bacillus megaterium* de Bary microorganism capable of accumulating 5'-nucleotides other than 5'-IMP, in the culture medium is also within the scope of this invention.

For the purpose of the industrial production of 5'-IMP by incubating adenine and amino acid double-requiring mutant of this invention, it is in general preferable to use liquid culture medium. Generally the incubation is carried out either stationarily or in the manner of a submerged process under aeration and/or agitation, employing a culture medium which must contain adenine source and amino acid source. Desirably the medium contains proper assimilable carbon source(s) and digestible nitrogen source(s).

As the adenine source, there are exemplified adenine itself, a substance which contains adenine component in its molecule and is easily convertible into adenine, or natural substance containing the said substance. For example, there may be employed adenine, adenosine, 3'-adenylic acid, succinoadenylic acid, meat extract, corn-steep liquor, and yeast extract, etc.

As amino acid source, there can be used an amino acid itself such as aspartic acid, lysine, threonine, valine, alanine, methionine, histidine, cystine and leucine; peptide; or natural substance containing the said amino acid and/or peptide, such as casein hydrolysate, meat extract and yeast extract. Natural substance containing adenine source as well as amino acid source, e.g. meat extract, yeast extract, is employable as adenine and amino acid source for a double purpose.

As the assimilable carbon source, one or more of starch, dextrin, sucrose, lactose, maltose, glucose, glycerol, etc. can be used, and various organic compounds or organic materials such as organic ammonium salts, organic nitrates, urea, etc. can be used not only as carbon source but also as digestible nitrogen source in the same way as the use of inorganic nitrogen sources, for example, inorganic ammonium salts such as ammonium sulfate, ammonium carbonate, ammonium phosphate, or various kinds of nitrates such as sodium nitrate, potassium nitrate, etc.

Generally, an addition of vitamins e.g. vitamin $B_1$, biotin, pantothenic acid, to the culture medium results in an increase in yield of 5'-IMP.

Adenine and amino acid source should be added to the culture medium in a sufficient amount for the growth of adenine and amino acid double-requiring mutant of this invention. Generally an addition of not less than 10 mg./liter and not more than 300 mg./liter when calculated in terms of adenine and an addition of not less than 50 mg./liter (ca. 0.5 mM.), preferably 100 mg./liter to 300 mg./liter when calculated in terms of a required amino acid, give a preferable effect.

Incubation conditions such as pH of the medium and incubation temperature should be controlled so as to have 5'-IMP accumulated in the maximum amount. Generally, the inital pH of the culture medium and the incubation temperature are preferably adjusted to 6.0–8.0 and 20 to 45° C., preferably 28 to 37° C., respectively.

Under the above-mentioned culture conditions 5'-IMP is produced and accumulated in the culture medium with the lapse of time.

Incubation is continued until the maximum amount of 5'-IMP is accumulated in the culture medium. Though the period required for the maximum accumulation of 5'-IMP is changeable depending on various factors, generally accumulated 5'-IMP in the culture medium reaches maximum usually within the 2nd day to 10th day from the starting of the incubation.

In the method of this invention, only 5'-IMP is accumulated in a large amount, and other 5'-nucleotide or nucleoside is hardly accumulated in the culture medium. Therefore, 5'-IMP is recovered by a simple procedure, e.g. by means of activated charcoal or anion exchange resin.

Following examples serve merely as illustrative of presently preferred embodiments of this invention and do not restrict the scope of this invention.

EXAMPLE 1

*Bacillus megaterium* de Bary 207m is incubated in 20% potato-agar slant containing 5 mg./l. of $MnSO_4$ at 30° C. for 4 days. Then, the spore is suspended in distilled water in an amount of $10^9$ ml., and the suspension is heated at 80° C. for 15 minutes. The resultant suspension is irradiated with ultraviolet ray for 4 minutes. 0.5 milliliter of the resultant suspension is inoculated on 5 ml. of culture medium having the following components, and incubated at 37° C. for 6 hours under shaking, followed by heating at 80° C. for 15 minutes.

Culture medium

| | |
|---|---|
| Glucose | grams 5 |
| Monosodium glutamate | do 2 |
| DL-alanine | do 1 |
| L-asparagine | do 1.5 |
| $K_2HPO_4$ | do 3 |
| $KH_2PO_4$ | do 1 |
| Sodium sulfate | do 1 |
| Magnesium sulfate | do 0.1 |
| Ferric citrate | do 0.1 |
| Distilled water | liter 1 |

The resultant broth is streaked on a complete medium of the following composition.

Complete medium

| | Grams/liter |
|---|---|
| Casein hydrolyzate | 8 |
| Polypeptone | 2 |
| Yeast extract | 5 |
| $K_2HPO_4$ | 3 |
| $KH_2PO_4$ | 1 |
| Glucose | 5 |
| Meat extract | 2 |
| Sodium chloride | 4 |

Adjusted to pH 7.0.

Colonies propagated on this complete medium are further subjected to replica-plating to a minimum medium of the composition shown below, to produce adenine-requiring mutant 207m-9.

Minimum medium

| | Grams/liter |
|---|---|
| Glucose | 10.0 |
| Monosodium glutamate | 6.5 |
| $K_2HPO_4$ | 3.0 |
| $KH_2PO_4$ | 1.0 |
| Sodium sulfate | 1.0 |
| Magnesium sulfate | 0.2 |
| Ferric citrate | 0.1 |

Adjusted to pH 7.0.

The produced mutant is further induced in like manner into adenine and amino acid double-requiring mutant 207m-9-A-4 (ATCC No. 19137).

The mutant is allowed to grow on the complete medium mentioned above at 28° C. for 2 days, then a loopful of the resultant wet cell paste is inoculated on 40 ml. of culture medium having the following composition, in a 200 milliliter Erlenmeyer flask, and incubated at 28° C. for 4 days:

| | |
|---|---|
| Glycerol | grams 20 |
| Casamino acid | do 20 |
| Sodium sulfate | do 4 |
| $Na_2HPO_4$ | do 5 |
| $KH_2PO_4$ | do 2 |
| $MgSO_4 \cdot 7H_2O$ | do 0.2 |
| $CaCl_2$ | do 0.1 |
| Adenine | milligrams 25 |
| Thiamine hydrochloride | do 100 |
| Water | liter 1 |

As a result, 3.2 mg./ml. of 5'-IMP and 0.4 mg./ml. of hypoxanthine are accumulated in the culture broth.

The culture filtrate is adjusted to pH 2 and then passed through a column (1 cm. x 15 cm.) packed with activated charcoal. After washing with water, the 5'-IMP is eluted completely with a mixture of methanol, ammonia and water (50:1:49). After being concentrated, the eluate is chromatographed by means of anion exchanger (quaternary strong base, formic acid form). The 5'-IMP fraction is again treated with the column packed with activated charcoal in the same way as mentioned above. To the eluate, adjusted to pH 8.5, methanol is added to 50% final concentration to give 105 milligrams of disodium 5'-inosinate.

EXAMPLE 2

Adenine and amino acid double-requiring mutant SM-601A-4 (ATCC No. 19136) is derived from *Bacillus megaterium* de Bary S (ATCC No. 14552) by an ultraviolet ray (10 watt) irradiation for 3 minutes from 50 cm. height, followed by penicillin screening (Experimentia 6, 41 (1960)) and replica plating (Journal Bacteriology 63, 399 (1952)).

So-obtained mutant is allowed to grow on bouillon-agar slant containing 0.2 mM. of adenine at 28° C. for 2 days. A loopful of the wet cell paste is taken from the agar slant, and it is inoculated on 40 ml. of the culture medium mentioned below, followed by incubation under shaking at 30° C. for 4 days.

Culture medium

| | |
|---|---|
| Mannitol | grams 30 |
| Monosodium glutamate | do 10 |
| Casein hydrolyzate | do 20 |
| $K_2HPO_4$ | do 7 |
| $KH_2PO_4$ | do 2 |
| Ammonium sulfate | do 1 |
| Magnesium sulfate | do 2 |
| Adenine | do 0.5 |
| Water | liters 1 |

In the culture filtrate obtained from the incubation there are found accumulated 1.7 mg./ml. of 5'-IMP and 0.25 mg./ml. of hypoxanthine; other nucleosides or nucleotides are hardly detectable.

The culture filtrate is then treated in the same way as in Example 1 to give 45 milligrams of disodium 5'-inosinate.

EXAMPLE 3

Adenine and amino acid double-requiring mutant 899-A-1125 (ATCC No. 19135) is derived from *Bacillus megaterium* de Bary 899 in the same way as in Example 1. The mutant is inoculated on 50 l. of culture medium of the same composition as in Example 1 and incubated under shaking at 28° C. for 5 days. In the culture filtrate, 2.8 mg./ml. of 5'-IMP, 0.1 mg./ml. of inosine, 0.3 mg./ml. of hypoxanthine and a trace amount of other nucleotides and nucleosides are accumulated.

Isolation of 5'-IMP thus accumulated is carried out as follows:

After being adjusted to pH 2.0, the culture filtrate is passed through a column (20 cm. x 100 cm.) packed with activated charcoal. 5'-IMP is eluted with 30 liters of a mixture of methanol, ammonia and water (30:1:69). After being concentrated, the eluate is adjusted to pH 8.0 with sodium hydroxide, followed by an addition of methanol up to 50% concentration. The resultant solution is cooled to 5° C. to give 125 grams of crystals of disodium 5'-inosinate.

The following test shows that the wild strains employed in the foregoing examples are capable of accumulating 5'-nucleotides in the culture medium.

TEST

The respective microorganisms *Bacillus megaterium* de Bary S, *Bacillus megaterium* de Bary 207m and *Bacillus megaterium* de Bary 899 are allowed to grow overnight on a nutrient agar slant containing 1% of glucose at 28° C., then a loopful of wet cell paste is inoculated to 40 ml. of liquid medium shown below and incubated on a rotary shaker at 28° C. for 5 and 7 days and the amount of 5'-nucleotides accumulated in the culture medium is measured.

One liter of the medium contains:

| | | |
|---|---|---|
| Mannitol | grams | 3 |
| Glutamic acid | do | 3 |
| $K_2HPO_4$ | do | 7 |
| $KH_2PO_4$ | do | 2 |
| $MgSO_4 \cdot 7H_2O$ | do | 0.2 |
| $(NH_4)_2SO_4$ | do | 1 |
| Ferric citrate | do | 0.1 |
| Vitamin $B_1 \cdot HCl$ | μg | 200 |
| Riboflavin | μg | 200 |
| Niacin | μg | 400 |
| Calcium pantothenate | μg | 400 |
| Biotin | μg | 10 |
| Folic acid | μg | 10 |
| p-Aminobenzoic acid | μg | 10 |
| Pyridoxine hydrochloride | μg | 200 |
| Inositol | μg | 200 |

RESULT

| Strain | Incubation Period | |
|---|---|---|
| | 5 days (mg./ml.) | 7 days (mg./ml.) |
| Bacillus megaterium S | 600 | 1,200 |
| Bacillus megaterium 207m | 450 | 750 |
| Bacillus megaterium 899 | 320 | 1,300 |

Throughout the specification, γ, ml., cm., mg., mM., μg., g. and l. mean, respectively, gamma(s), milliliter(s), centimer(s), milligram(s), millimol(s), microgram(s), gram(s) and liter(s). Numbers attached to the respective names of microorganisms are accession numbers of microorganisms at American Type Culture Collection, Washington, D.C.

Having thus disclosed this invention, what is claimed is:

1. A method for producing 5'-IMP, which comprises inoculating an adenine and amino acid double-requiring mutant induced from a *Bacillus megaterium* de Bary microorganism capable of accumulating 5'-nucleotides other than 5'-IMP, into a culture medium containing adenine source and amino acid source, incubating said culture medium until 5'-IMP is accumulated in the culture medium, and recovering the 5'-IMP thus accumulated from the culture medium.

2. A method according to claim 1 wherein the culture medium contains, in addition to adenine source and amino acid source, assimilable carbon source, digestible nitrogen source, vitamin and other nutrients necessary for the growth of the mutant, and the incubating is carried out under shaking said culture medium at a temperature of 20–45° C.

3. The method claimed in claim 2, wherein the microorganism is *Bacillus megaterium* de Bary S.

4. The method claimed in claim 2, wherein the microorganism is *Bacillus megaterium* de Bary 207m.

5. The method claimed in claim 2, wherein the microorganism is *Bacillus megaterium* de Bary 899.

References Cited

UNITED STATES PATENTS 3,152,966   10/1964   Kinoshita et al.   195—28

ALVIN E. TANENHOLTZ, *Primary Examiner.*